United States Patent [19]

Shimoni

[11] Patent Number: 4,907,288
[45] Date of Patent: Mar. 6, 1990

[54] IMAGE CONTRAST ENHANCEMENT ARRANGEMENT

[75] Inventor: Yair Shimoni, Jerusalem, Israel

[73] Assignee: Elscint Ltd., Haifa, Israel

[21] Appl. No.: 98,742

[22] Filed: Sep. 16, 1987

Related U.S. Application Data

[63] Continuation of Ser. No. 668,943, Nov. 7, 1984, abandoned.

[30] Foreign Application Priority Data

Nov. 13, 1983 [IL] Israel .......................................... 70214

[51] Int. Cl.$^4$ ............................................. G06K 9/40
[52] U.S. Cl. ...................................... 382/54; 358/169;
364/413.19; 382/6
[58] Field of Search ............... 382/6, 41, 54; 358/284,
358/166, 169, 282, 464; 364/414, 413.13,
413.14, 413.15, 413.16, 413.19, 413.23

[56] References Cited

U.S. PATENT DOCUMENTS

| 4,156,914 | 5/1979 | Westell | 382/54 |
|---|---|---|---|
| 4,193,089 | 3/1980 | Brougham et al. | 358/111 |
| 4,315,318 | 2/1982 | Kato et al. | 382/6 |
| 4,317,179 | 2/1982 | Kato et al. | 382/6 |
| 4,346,409 | 8/1982 | Ishida et al. | 358/111 |
| 4,394,688 | 7/1983 | Iida et al. | 382/54 |
| 4,438,495 | 3/1984 | Collins et al. | 358/166 |
| 4,517,607 | 5/1985 | Ohkouchi et al. | 382/54 |
| 4,559,557 | 12/1985 | Keyes et al. | 358/166 |
| 4,575,758 | 3/1986 | Egeröd et al. | 358/166 |
| 4,611,247 | 9/1986 | Ishida et al. | 364/414 |

Primary Examiner—Leo H. Boudreau
Assistant Examiner—Joseph Mancuso
Attorney, Agent, or Firm—Sandler & Greenblum

[57] ABSTRACT

Means and methods for correcting the loss of contrast caused by modulation transfer function (MTF) effects in imaging. Images of small objects are enhanced without adversely affecting large object images. A homogeneous background is provided and image contrast is obtained with total MTF effects. The scale of the determined image contrast is manipulated to cause the contrast to approximate an ideal contrast not affected by the MTF contrast reduction.

15 Claims, 3 Drawing Sheets

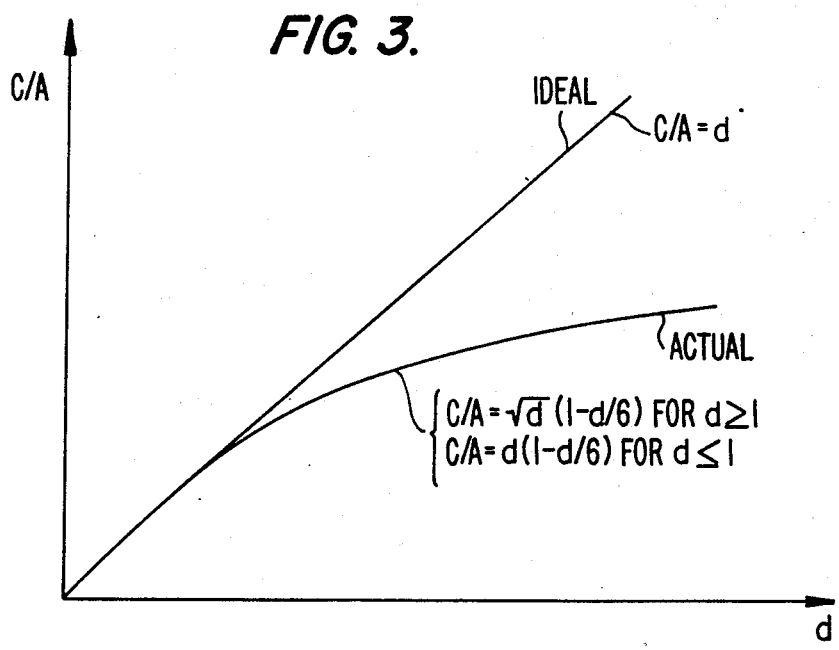
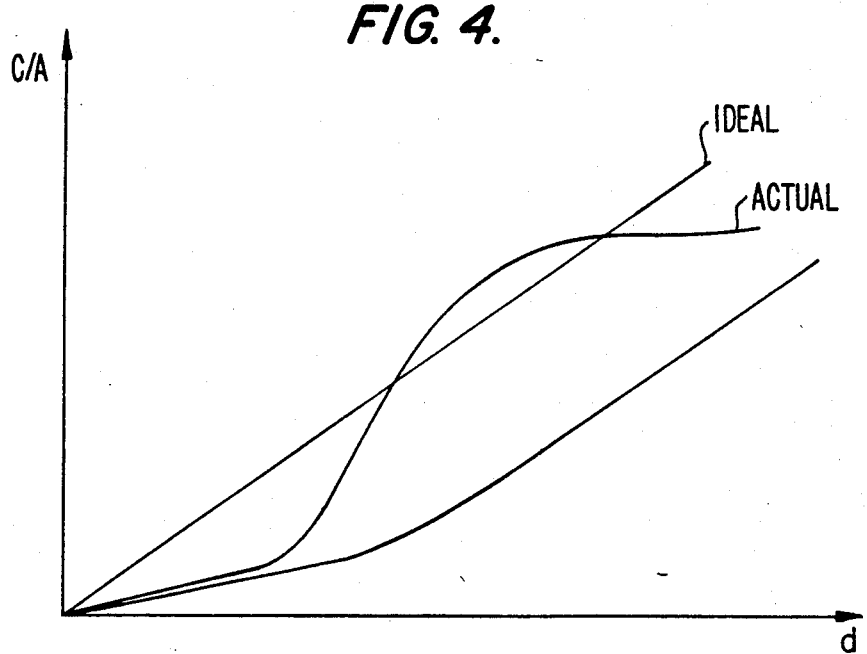

IMAGE CONTRAST ENHANCEMENT ARRANGEMENT

This application is a continuation of application Ser. No. 668,943, filed Nov. 7, 1984.

FIELD OF THE INVENTION

This invention is concerned with computer inhanced imaging and more particularly to methods and systems using scale manipulation in subtraction imaging to correct for contrast deterioration.

BACKGROUND OF THE INVENTION

When radiation passes through a small hole or narrow slit or is attenuated by a small pin or a narrow bar the resulting image "spreads" and is larger or wider than the original object and the contrast between the image and the background is reduced. This is a combined result of energy and diffraction and scatter, inaccuracies in the detection means, electronic noise and digitization errors. The exact functional shape of the "spread" is known as the "modulation transfer function" or MTF. Imaging systems have total "MTF's" that are the result of the combination of the MTF's of each of the specific spreading mechanisms in the image. In summary the images of holes and slits or pins, and bars are "spread" and of reduced contrast as compared to the actual objects.

The MTF usually defines a fixed addition to the linear dimensions and a concomitant reduction from the contrast of any object. Thus, when the slit or bar or hole or pin is large enough the average size and contrast are for practical purposes unchanged from that of the actual object. When the objects are small, the average contrast in the image is proportional to both the objects contrast and width.

There have been many attempts to correct for the MTF spreading. For example, complicated "restoring" filters which attempt to resharpen the spread images have been used. The presently used restoring filters are time-comsuming and "noisy". Hence they enhance the noise already present in the image and thus tend to detract from the system efficiency and the image quality.

In many studies using image enhancing techniques the slight enlargement of the object is not as much of a problem as the deterioration in contrast caused by the MTF generated spreading.

For example, in digital fluorography and similar studies where the vascular system is being studied; it is of little consequence to the detectability of the blood vessels when the image of the blood vessels are slightly enlarged. Whereas, if the contrast is reduced it becomes impossible to detect or distinguish the smaller blood vessels.

One solution to the MTF generated spreading problem is to use a different "window" (grey scale stretching) for viewing the smaller blood vessels. The "solution" results in a more contrasty scale, which loses vital details in larger vessels. Also, when using this "solution" the "correct" window has to be found manually; a time consuming process. Another attempted solution to the MTF generated spreading problem is to use a nonlinear scale. For example the (double window), comprising two separate linear parts covering the large vessels and the small vessels, respectively. Other nonlinear scales (eg. exponential and logarithmic scales) have been used but with no theoretical background they tend to distort the relative contrast, lose details and make densitometric calculations impossible.

Thus there is a real long-felt need to correct for the contrast deterioration of images caused by MTF generated spread of the objects in the images.

BRIEF DESCRIPTION OF THE INVENTION

Accordingly preferred methods are presented for use in subtraction imaging for correcting contrast deterioration caused by the MTF of objects. These methods enhance the images of small objects without adversely affecting the images of large objects, the correction being effective even when only one window is used for viewing both large and small objects.

According to a broad aspect of the invention said method comprises the steps of:

providing homogeneous backgrounds for objects being imaged by substracting the first image from a secon image, determining the actual image contrast as obtained with modulation transfer function effects, and manipulating the scale of the determined actual image contrast to cause the determined actual image contrast to approximate an ideal contrast not affected by modulation transfer function deterioration.

A feature of the invention manipulates the scale using a previously prepared table made from manipulation of an ideal contrast function.

The step of manipulating the scale can be accomplished in many ways within the scope of the invention. One of the ways, for example, contemplates manipulating the scale using a previously prepared table made from a comparison of an ideal contrast function to a measured contrast function.

The measurements required to obtain the table are usually tedious and time-consuming. Accordingly it is desirable to use methods that require a minimum amount of measurements. To reduce the amount of measurement the slope of the function can be determined from theoretical considerations if certain assumptions are made, such as that the image contains only vessels in the plane under study and that the contrast material density is constant. If proper assumptions are made the only measurements needed to obtain the shape of the response function are MTF measurements also used for normalization and scaling. The slope of the measured value versus the true value is readily obtainable from the MTF measurements.

Another manipulation method includes the steps of:

using an approximate MTF with a sample shape, which is a triangular function having the same full width at half maximum (FWHM) as the known exact MTF, compiling approximately the contrast loss due to MTF spread for given object sizes. The triangular function yields the following contrast versus size functions:

$$C = A(d^2 - d^3/3)$$

where $d \geq 1$, $$C = A(d - d^2/3)$$

where $d \geq 1$

While the ideal contrast function is:

$$C = Ad$$

where $d \geq 1$, $$2C = Ad$$

where $d \leq 1$.

Herein:
$A = \beta \rho r$
$d = R/r$
with:
$\beta$ being a proportionality constant;
$\rho$ being the density of contrast material;
$r$ being the full width at half the maximum (FWHM) height of the MTF, and
$R$ being the dimension of a side of the blood vessel -(assumed to be a square cylinder)

The above described and other features and objects of the invention will be best understood when considered in the light of the following description of the invention taken in conjunction with the accompanying drawing wherein:

BRIEF DESCRIPTION OF THE DRAWINGS

FIG. 3 is a graphical showing of the results of using one contrast degradation correcton method; and FIG. 4 is yet another graphical showing of the results of using yet another cntrast degradation correction method.

GENERAL DESCRIPTION

Figure 1:
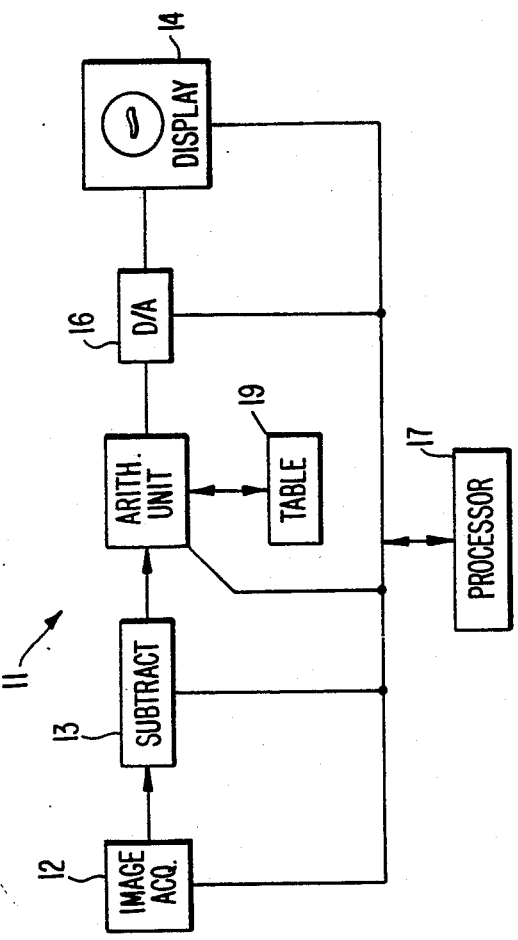
FIG. 1 is a block diagram showing of an imaging system for using the inventive contrast degradation correction methods.

As shown in FIG. 1 the method is ideally suited for subtraction imaging systems such as used in digital fluoroscopy (DF.). The system 11 of FIG. 1 is a typical DF. type system. An image acquisition unit 12, acquires the images which are taken before and after the contrast material is added. The subtraction unit 13 subtracts images acquired prior to the addition of the contrast material from the images acquired subsequent to the addition of the contrast material to provide images of objets having homogeneous backgrounds. The image data output from subtraction unit 13 is preferably, but not necessarily. in digital form. Note that the images referred to herein are basically of small objects i.e. blood vessels having an MTF effect that reduces the contrast in the final image.

Means are provided to correct for the reduction in contrast that normally occurs when imaging blood vessels. More particularly means are provided for manipulating the scale of the image on the display monitor 14 to enhance the contrast by restoring contrast lost due to the modulation transfer function characteristic. The image appears on the monitor when the data from the subtraction unit 13 is converted to analog video signals by the digital to analog converter 16. The system is under the control of a processor 17 which among other things manipulates the scale to control the contrast. As shown in FIG. 1 an arithmetic unit 18 and a table 19 are preferably used by the system under the control of the processor for this purpose.

FIGS. 3 and 4 show different types of scale manipulations contemplated. The type actually used depends on the equipment available and the results desired. For example, where the aim is to obtain images showing smaller blood vessels, a different scale manipulation is used then where the aim is to image the larger blood vessels. In all of the scale manipulations it is important that the object is viewed in a relatively homogeneous background. All of the manipulations described hereinbelow enhance vessels of the particular size desired while not adversely affecting the contrast and hence the visibility of the vessels of different sizes.

Figure 2A:
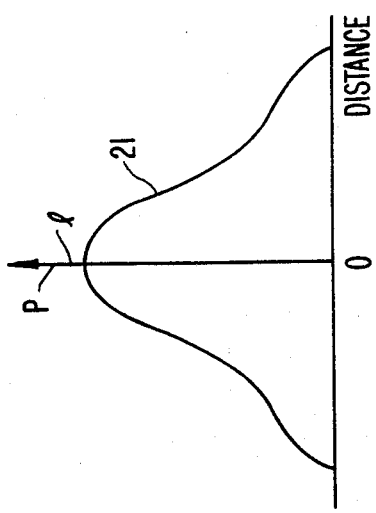
FIG. 2 is a graphical showing of (a) a typical MTF, (b&c) are different versions of response curves based on the MTF.

By way of background explanation FIG. 2a graphically shows the spread MTF of a point source. The axes are shown as intensity versus the distance from the position of the line image of the point source. The ideal image is concentrated in a point (p) or line L with no dimensions. The actual image is spread by the MTF. The curve shown is basically a single peak symetric function e.g. a Gaussian. Many types of functions can be used in addition to Gaussian functions within the scope of the invention, such as triangular, rectangular step, and mesa functions.

Figure 2B:
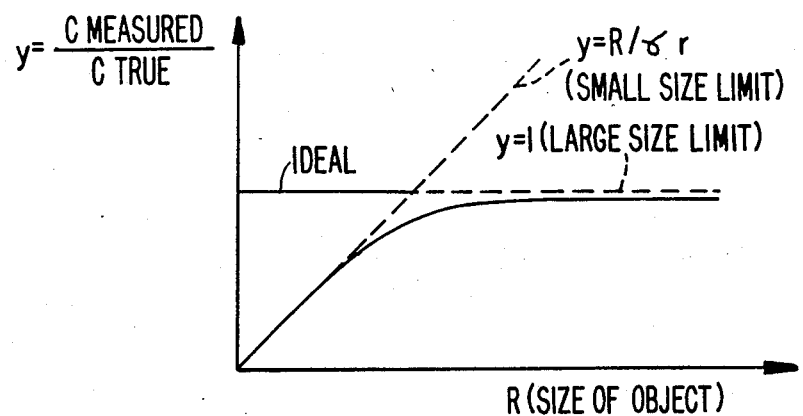

FIG. 2(b) shows the response function of the measured contrast divided by the true contrast versus the linear dimension R of the side of a blood vessel where the assumption is that the blood vessel is a hollow pipe with a rectangular transverse cross section and with one side parallel to the line of sight. As the dimension of the side of the blood vessel increases the measured value approaches the true value. For small vessels the response function is asymptotically linearly dependent on the size.

Figure 2C:
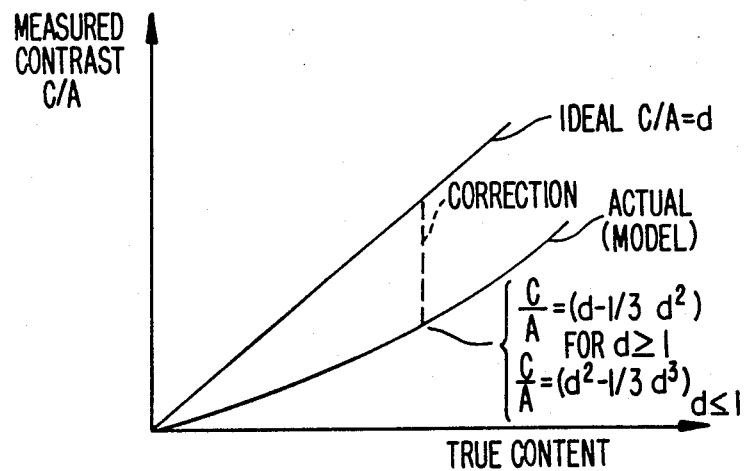

FIG. 2(c) shows the same measured (actual) contrast as a function of the true contrast. From this representation it is easier to derive the necessary corrections to the contrast at any desired point.

In a preferred procedure of the invention the MTF function is assumed to be triangular. It could within the scope of the invention be considered as Gaussian or some other shape.

If it is assumed that the blood vessels are square hollow pipes, with sidew always normal to the line of sight, rather than being cylindrical, the true contrast in digital subtraction angiography can be shown to be: $C \approx \beta \rho R$
where $\rho$ = density of the contrast material
$R$ = the dimension of the pipe side, and
$\beta$ = a proportionality constant, The MTF causes the response function of the image to approximate:

$$\text{Contrast measured /contrast true} = \frac{R}{R + \gamma r}$$

where
$r$ is the FWHM of the MTF,
$\gamma$ is a constant of proportionality depending to some extent on the shape of the MTF.

In small blood vessels the contrast, measured/contrast true is therefore =

$$\frac{R}{\gamma r}$$

(as shown in FIG. 2(b) and the contrast measured is approximately $$\beta \rho \frac{R^2}{\gamma \nu}.$$

This indicates that the image of small blood vessels show reduced amounts of energy.

$$A = \beta pr\, d = R/r\gamma,$$

Ideally, without MTF effects C=Ad for any $R_j$ actually however, because of MTF effects and with a triangular MTF, the following equations apply:

$$C = A(d - d^2/3)$$

when $d \geq 1$ $$C = A(d^2 - d^3/3).$$

The ideal and actual functions are shown in FIG. 2(c) If the r of the MTF is known the arithmetic unit can compute what the theoretical ideal value of contrast should be for any measured value.

However, correcting each pixel value in a large image may be too time consuming. A preferred method is therefore calculating a look-up table where input is any measured value and output is the approximate ideal value. Such look-up table mechanisms are well known in the art of image processing.

CONTRAST SCALE MANIPULATION WITH ASSUMED FWHM (ra)

If the r is not known, its value can be assumed to be ra and used in the correction method and means. Using $r_a$ instead of changes the obtained contrast values to:

$$c' = A \cdot d \left\{ \left(1 - 1/3 \frac{(v - va)}{(R - ra/3)}\right) \right\} \text{when } d \geq 1 \text{ and}$$

$$c' = A^*d - \frac{va^2}{v^2}\left(1 - \frac{(v - va)}{(v_a - R/3)}\right) \text{when } d \leq 1,$$

Thus when $ra \approx r$, the obtained result is close to the ideal.

SMALL VESSEL ENHANCEMENT IN GENERAL

Among the approximations that are useful for enhancing the small vessels is one using the relationship:

$$C^{(2)} = \sqrt{AC} \text{ measured}$$

The obtained result from the approximation can be written in terms of variables A and d as follows:

$$C^{(2)} = A\sqrt{d} (1 - d/6)$$

when $d \geq 1$ and $$C^{(2)} = Ad (1 - d/6)$$

when $d \leq 1$ which is a good approximation for small vessels (d<1).

SMALL VESSEL ENHANCEMENT USING A WINDOW OR SQUARING THE REVERSE

This relationship is shown in FIG. 3.

Another approximation useful for small vessels viewed only over a certain "window" out of the total value range may be called "squaring the reverse" by reverse is meant that in the display image, the black becomes white and the white becomes black. Thus for example, if in the gray scale, 0 is normally black and 7 is normally white, then 7 becomes black and 0 becomes white. This is a well known technique in imaging and the software of most imaging systems include steps for "reversing".

One can choose a "window of interest" and transform the contrast curve in the window to be close to the ideal linear one.

Say the window is between the threshold value T and the upper value U. A 'stretched' scale is the transformation of T to O and U to an upper numerical bound W, so that, $$C^{(1)} = W(C - T)/(U - T)$$

(stretched window)

A reversed scale is:

$$C^{(2)} = W - C^{(1)} = W(U - C)/(U - T)$$

(scale reversal)

where T is changed to W and U to 0. The 'reversal' operation is its own complementary operation:

$$C^{(3)} = W - C^{(2)} = C^{(1)}$$

A special window starts at T=0. Then:

$$C^{(2)} = W/U - C$$

(C is the range O−U, $C^{(2)}$ is O-W) (special window).

The 'reversed' scale is:

$$C^{(2)} = W(U - C)/U$$

(again in the same ranges) (scale reversal).

At this point a square-law scale is used:
$$C^{(3)} = (1/W)C^{(2)2} = W(U - C^{(2)})/U^2$$

(in the same ranges). (squaring the reverse)

Now reversing again:

$$C^{(4)} = W - W(U - C)/U$$

(in the same ranges).

And the special case of no stretching: W−U $$C^{(5)} = U - (U - C)^2/U = 2C - C^2/U$$

(both C and $C^{(5)}$ in the range O-U)

If C is the measured contrast, then using A and d the contrast may be described as:

$$C^{(5)} \approx 2Ad^2 - 2Ad^3/3$$

$d < 1$ and $$C^{(5)} \approx 2Ad - (2A/3 + A/U)d$$

$d > 1$ which starts off as a square-law (parabola) for d~0, then crosses the ideal value at approximately d~64 and d~1.5 (see FIG. 4). This approximation is therefore valid for a wider "window" from the previous one. However, this scale must not be used for C>U as it yields a two valued solution. It is very useful for actual images, when care is taken to chose U higher than any value C in the image. It is especially useful as actually DSA images are many times taken in reverse scale so the contrast material shows in black.

While the invention has been described in relation to particular apparatus and methods, it must be understood that the description is made by way of example and not as a limitation on the scope of the invention. It should be particularly that other approximations are possible within the scope of this invention.

I claim:

1. A method of correcting for the loss of contrast caused by modulation transfer function (MTF) effects in angiographic imaging, said method enhancing the images of small objects without adversely affecting the images of larger objects, the correction being effective even when using only a single window for viewing both large and small objects, the said method comprising the steps of:

acquiring x-ray image data for use in displaying blood vessels being imaged, providing homogeneous backgrounds for said blood vessels being imaged by subtracting image data acquired before the addition of contrast material into said blood vessels from image data acquired after the addition of contrast material into the blood vessels;

determining the image contrast as acquired with total system MTF;

inserting a value for the full width at half maximum (FWHM) of the MTF; and changing the scale of the determined image contrast based on said value of the FWHM of the MTF to cause the determind imaged contrast to approximate an ideal contrast not affected by the MTF contrast reduction to thereby correct for the loss of contrast due to MTF effects.

2. The method of claim 1 wherein the step of manipulating the scale comprises the step of using a previously prepared look-up table to approximate the ideal contrast.

3. The method of claim 2 wherein the step of manipulating comprises preparing said look-up table by:

comparing an ideal contrast function to a measured contrast function.

4. The method of claim 1 wherein the step of manipulating includes using a known full width at half maximum (FWHM) of the MTF to approximate the ideal contrast.

5. The method of claim 1 wherein the step of manipulating includes using an approximated full width at half maximum (FWHM) of the MTF to obtain the ideal contrast.

6. The method of claim 1 including using an assumed triangular MTF to approximate an ideal contrast.

7. The method of claim 1 including assuming that long thin objects in the image such as veins have square cross sections.

8. The method of claim 1 wherein said manipulating step includes reversing the scale and squaring the reversed scale.

9. A system for correcting for loss of contrast caused by modulation transfer function effects (MTF) in angiographic imaging, said system enhancing the images of small objects without adversely affecting the images of larger objects, the correction being effective even when only a single window for viewing the large and small objects is used, said system comprising:

means for providing homogenous backgrounds for objects being imaged by subtracting images of blood vessels without contrast material added to the blood vessels from images of the blood vessels with contrast material added;

means for determining the image contrast as acquired with total system MTF effects;

means for inserting a value for the full width at half maximum (FWHM) of the MTF; and means for changing the scale of the determined imaged contrast based on said FWHM value of the MTF to cause the determined contrast to approximate an ideal contrast not affected by the MTF contrast reduction.

10. The system of claim 9 wherein the manipulating means comprises means for using a prepared look-up table to approximate an ideal contrast.

11. The system of claim 10 wherein the manipulating means comprises means for preparing said lookup table, said look-up table preparing means including means for comparing an ideal contrast function to a measured contrast function.

12. The system of claim 20 wherein the manipulating means includes means for determining and using a known full width at half maximum (FWHM) of the MTF for determining an ideal contrast.

13. The system of claim 9 wherein the manipulating means includes means for using an approximated full width at half maximum (FWHM) of the MTF for determining an ideal contrast.

14. The system of claim 9 including means for using an assumed triangular MTF to obtain an ideal contrast.

15. The system of claim 9 wherein long thin objects in the image such as veins are assumed to have rectangular cross-sections.

* * * * *